Dec. 23, 1924.
F. G. BLOCH
1,520,004
LEVEL INDICATING DEVICE
Filed Dec. 1, 1920
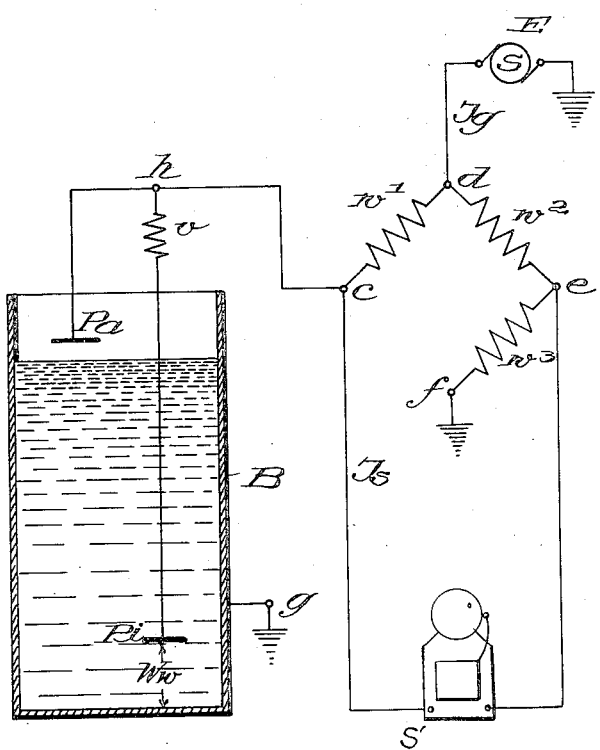
Inventor:
Franz Georg Bloch
By C. P. Goepel
Attorney Patented Dec. 23, 1924.

1,520,004

UNITED STATES PATENT OFFICE.

FRANZ GEORG BLOCH, OF BOBLINGEN, GERMANY.

LEVEL-INDICATING DEVICE.

Application filed December 1, 1920. Serial No. 427,647.

(GRANTED UNDER THE PROVISIONS OF THE ACT OF MARCH 3, 1921, 41 STAT. L., 1313.)

*To all whom it may concern:*

Be it known that FRANZ GEORG BLOCH, citizen of the Republic of Germany, residing at Boblingen, in Wurttemberg, Germany, has invented certain new and useful Improvements in Level-Indicating Devices (for which I have filed applications in Germany December 4th, 1918, Patent No. 319,145, and England July 10, 1920, Patent No. 148,830), of which the following is a specification.

This invention relates to an electrical long distance signalling device for the purpose of indicating the highest and lowest levels of a liquid in a reservoir at any desired distance by optical or acoustical signals without the use of mechanically moved parts or auxiliary circuits, but solely by the insertion in the circuit of a combination of resistances.

Similar devices are known but in these the signal is effected either by mechanical elements such as floats or by contacts with relays. Signal-devices are also known in which the signal-circuit without the employment of mechanically movable parts is immediately closed by the liquid. These devices, however, only allow the signal to be given when the liquid is rising and reaches the contact. As the level indication is obtained without the employment of mechanically movable parts or auxiliary circuits but only by using a combination of resistances, the device by its certainty of operations overcomes all known objections to apparatus of this type.

This effect is obtained by connecting up the resistances which are placed in the circuit like a Wheatstone bridge, the liquid resistance and the return resistance $Ww$ forming one of the resistances of the said bridge. In the bridge connection, which is shown by the resistances $w^1$, $w^2$, $w^3$, and $c$ to $f = Ww$, the minimum contact $Pi$ is also included by this arrangement. The resistance $Ww$ will therefore have a definite value, as long as $Pi$ dips into the liquid in the reservoir, otherwise it will be infinitely great. The above mentioned resistances are so calculated that the signalling current between $c$ and $e = o$ as long as $Pi$ is in the liquid. If on the other hand, the liquid falls below $Pi$ the equilibrium is disturbed and a stronger equalizing current flows thru the signalling circuit. In order to make the apparatus practically non-sensitive to variations of $Ww$, which the conductivity of the liquid and also the return conductor (if it be in the form of an earth return) naturally brings about, a high reducing resistance $v$ is placed in the circuit between $Pi$ and $c$. Even a fluctuating resistance of the liquid in comparison with the sum of $Ww + v$ is then incapable of giving such a deflection in the circuit as would cause a signal to be given, as long as the liquid still washes around the contact.

In order to enable the apparatus to indicate the high level by a signal, it is sufficient to provide a second contact $Pa$ at a suitable height connected up in parallel with $Pi$ but beyond $v$ in the circuit. If the liquid short-circuits the contact, the intermediate resistance of $Pa$ is connected up in parallel with $v + Ww$, thereby so reducing the value of the bridge resistance between $c$ and $f$, that a more powerful signalling current flows in the opposite direction to that in which it flows when a minimum signal is given. Without the use of the resistance $v$, the signalling current would not be powerful enough when a short circuit occurred. The action of the apparatus, the scheme of connections of which is shown in the drawing, is as follows:—

The current flows from the source of current E to the point $d$ where it divides, and flows over a bridge connection firstly thru $w^2$ and $w^3$ to $f$ and then through ground to the other pole of the source E and secondly thru $w$ thru $c$, $h$, and $v$ to W' and thence through the ground connection $g$ to E. The two points $g$ and $f$ are supposed to be earthed and consequently form the return conductor to the source of current, the second pole of which is likewise earthed. Between $c$ and $e$ is placed the signalling apparatus S'.

The bridge connection and the value of the resistance according to the equation $$w^1 : w^2 = Ww : w^3 \quad (I)$$

ensures that the equalizing current which passes through the signalling conductor is $$J_s = o \quad (II)$$

as long as $Pi$ is surrounded by the liquid, and $Pa$ on the other hand is not touched by the level of the liquid.

When the level of the water rises to the highest permissible value, so that the contact $Pa$ is reached by the water the resistance between $c$ and $g$ or $c$ and $f = o$. This no longer satisfies Equation I and a compensating or equalizing current must flow from $c$ to $e$.

If on the other hand, the liquid drops so far that the contact $Pi$ is no longer touched by the liquid, the resistance $$Ww = \infty$$

whereby Equation I is also no longer satisfied and a compensating or equalizing current flows from $e$ to $c$. As the equalizing current in each case passes thru the signal $S'$, this latter is brought into operation.

I claim:

1. In a level indicating device, in combination with a tank, a conductor extending downwardly into the tank to a predetermined low level thereby defining a gap between its lower end and the wall of the tank and a Wheatstone bridge arrangement including in one of its branches, the resistance represented by said gap.

2. Device according to claim 1 including a resistance member in advance of the conductor and in series therewith, a second conductor extending into the tank to a predetermined high level thereby defining a gap between its lower end and the wall of the tank, an electrical connection between the free end of the resistance member and the second conductor and a Wheatstone bridge including in one of its branches the resistance between said electrical connection and the wall of the tank as represented by said resistance member, said conductors and said gaps.

FRANZ GEORG BLOCH.